United States Patent [19]

Umezawa

[11] 4,388,986
[45] Jun. 21, 1983

[54] SPEED CHANGE CONTROL SYSTEM FOR AN AUTOMATIC TRANSMISSION

[75] Inventor: Mitsuo Umezawa, Akikawa, Japan

[73] Assignee: Fuji Jukogyo Kabushiki Kaisha, Tokyo, Japan

[21] Appl. No.: 252,767

[22] Filed: Apr. 10, 1981

[30] Foreign Application Priority Data

Jun. 4, 1980 [JP] Japan ............................ 55-78612[U]

[51] Int. Cl.³ ............................................ F16F 49/12
[52] U.S. Cl. .................................... 188/77 R; 92/52; 92/65
[58] Field of Search .................... 188/77 R, 347, 348; 92/52, 63, 65

[56] References Cited

U.S. PATENT DOCUMENTS 2,966,888 1/1961 Jania et al. .............................. 92/52
3,188,922 6/1965 Cruse ...................................... 92/52
3,353,637 11/1967 Chana ........................... 188/77 R X

*Primary Examiner*—Duane A. Reger
*Attorney, Agent, or Firm*—Martin A. Farber

[57] ABSTRACT

A speed change control system for an automatic transmission for motor vehicles having a planetary gear mechanism and a brake band for altering the transmission ratio. The system is to tighten gradually the brake band. The system comprises a servo-piston, a piston rod secured to the servo-piston and to the brake band, and an accumulator piston axially slidably disposed in the bore of the servo-piston. The servo-piston is biased by a first spring for returning the servo-piston for releasing the brake band, and the accumulator piston is biased by a second spring. Apply side and release side oil chambers are formed on opposite sides of the servo-piston, and an accumulator oil chamber is formed by the accumulator piston in the bore. Pressure oil is applied to the apply side oil chamber, so that the servo-piston moves in a brake band engagement direction against the first spring. After that, the accumulator piston moves a predetermined stroke against the second spring. Thereafter, the accumulator piston engages with the servo-piston, so that both pistons move together for tightening the brake band.

11 Claims, 3 Drawing Figures

SPEED CHANGE CONTROL SYSTEM FOR AN AUTOMATIC TRANSMISSION

BACKGROUND OF THE INVENTION

The present invention relates to a speed change control system for an automatic transmission for motor vehicles.

The automatic transmission having a planetary gear train has a brake band which is operated by a servomechanism for altering the transmission ratio. If the oil pressure for the servomechanism increases rapidly, the brake band is suddenly tightened. As a result, a large shock in the speed change operation occurs. Heretofore, in order to reduce the speed change shock, an orifice is provided in an inlet port of the oil chamber for the servo-piston, so that the pressure of the oil may slowly increase. However, such a device cannot sufficiently eliminate the speed change shock.

SUMMARY OF THE INVENTION

The object of the present invention is to provide a speed change control system for an automatic transmission which may prevent the shock in the speed change operation by the brake band.

According to the present invention, there is provided a speed change control system for an automatic transmission having a planetary gear mechanism, and a brake band for altering the transmission ratio, comprising a body having a cylindrical chamber, a servo-piston slidably disposed in the cylindrical chamber, a piston rod secured to said servo-piston and to said brake band, an axial bore provided in the servo-piston, an accumulator piston slidably disposed in the axial bore, a first spring provided between the servo-piston and the wall of the body for returning the servo-piston for releasing the brake band, a second spring operatively connected between the accumulator piston and a the servo-piston for biasing the accumulator piston in the axial bore, apply side and release oil chambers formed on opposite sides of the servo-piston, an accumulator oil chamber formed in the axial bore on one side of the accumulator piston, ports for applying pressure oil to the oil chambers on the opposite sides of the servo-piston, passage means for communicating the apply side oil chamber with said accumulator oil chamber, and means for engaging the accumulator piston with the servo-piston after the accumulator piston has moved a predetermined stroke against the second spring, the accumulator piston in cooperation with the springs and servo-piston for moving after the servo-piston moves by the pressure oil against the first spring.

Other objects and features of the present invention will be more apparent from the following description with reference to the accompanying drawings.

DETAILED DESCRIPTION OF THE PREFERRED EMBODIMENTS

Figure 1:
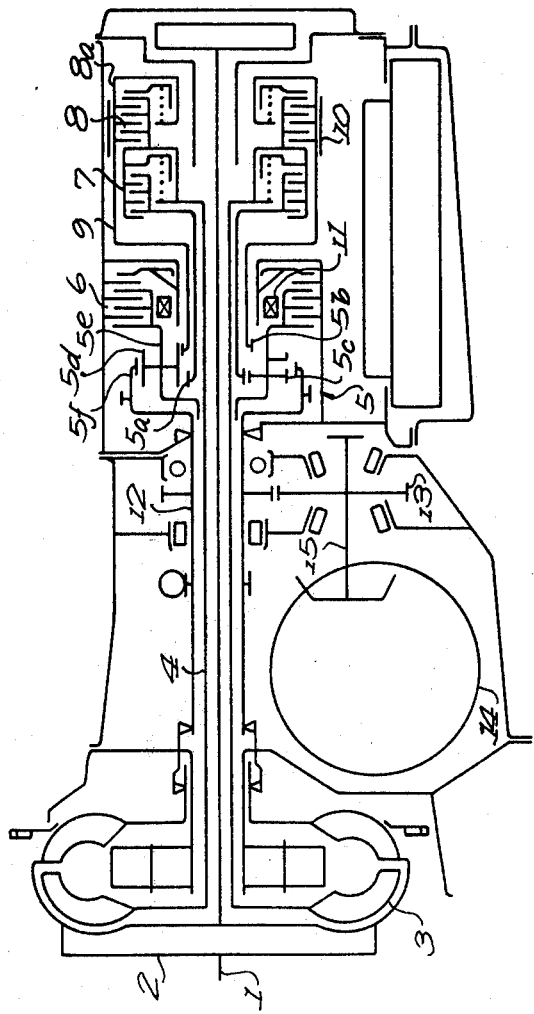
FIG. 1 is a schematic illustration of an automatic transmission in which an apparatus of the present invention is provided.

Referring to FIG. 1, a crankshaft 1 of an internal combustion engine is connected to a drive plate 2 of a torque convertter 3. A turbine shaft 4 of the torque converter 3 extends through a planetary gear 5. The planetary gear 5 is provided with a low and reverse brake 6, forward clutch 7 and reverse clutch 8. The turbine shaft 4 is connected to a forward sun gear 5a of the planetary gear 5 through the forward clutch 7 and also connected to a reverse sun gear 5b through the reverse clutch 8 and connecting shell 9. A drum 8a integral with the connecting shell 9 is provided with a brake band 10 for locking the reverse sun gear 5b.

The low and reverse brake 6 is provided on a carrier 5e which supports a short pinion 5c and a long pinion 5d. A one-way clutch 11 is provided between the carier 5e and the stationary portion. Thus, the carrier 5e is locked by the brake 6 or a one-way clutch 11. A ring gear 5f engaged with the long pinion 5d is connected to an output shaft 12 coaxial with the turbine shaft 4. The output of the transmission is transmitted to a drive pinion 15 of a differential mechanism 14 through a reduction gear 13.

In the forward driving condition, the forward clutch 7 is engaged, so that the rotation of the turbine shaft 4 is transmitted to the forward sun gear 5a. When the carrier 5e is locked by the one-way clutch 11, the power is transmitted to the output shaft 12 through the ring gear 5f at a large reduction ratio (the first speed). When the car speed increases, the brake band 10 operates so that the reverse sun gear 5b is locked. Thus, the second speed is provided. Further, when the brake band 10 is released and the reverse clutch 8 is engaged, the sun gears 5a and 5b undergo the same rotation. Thus, the turbine shaft 4 is directly connected to the output shaft 12 (the third speed).

Figure 2:
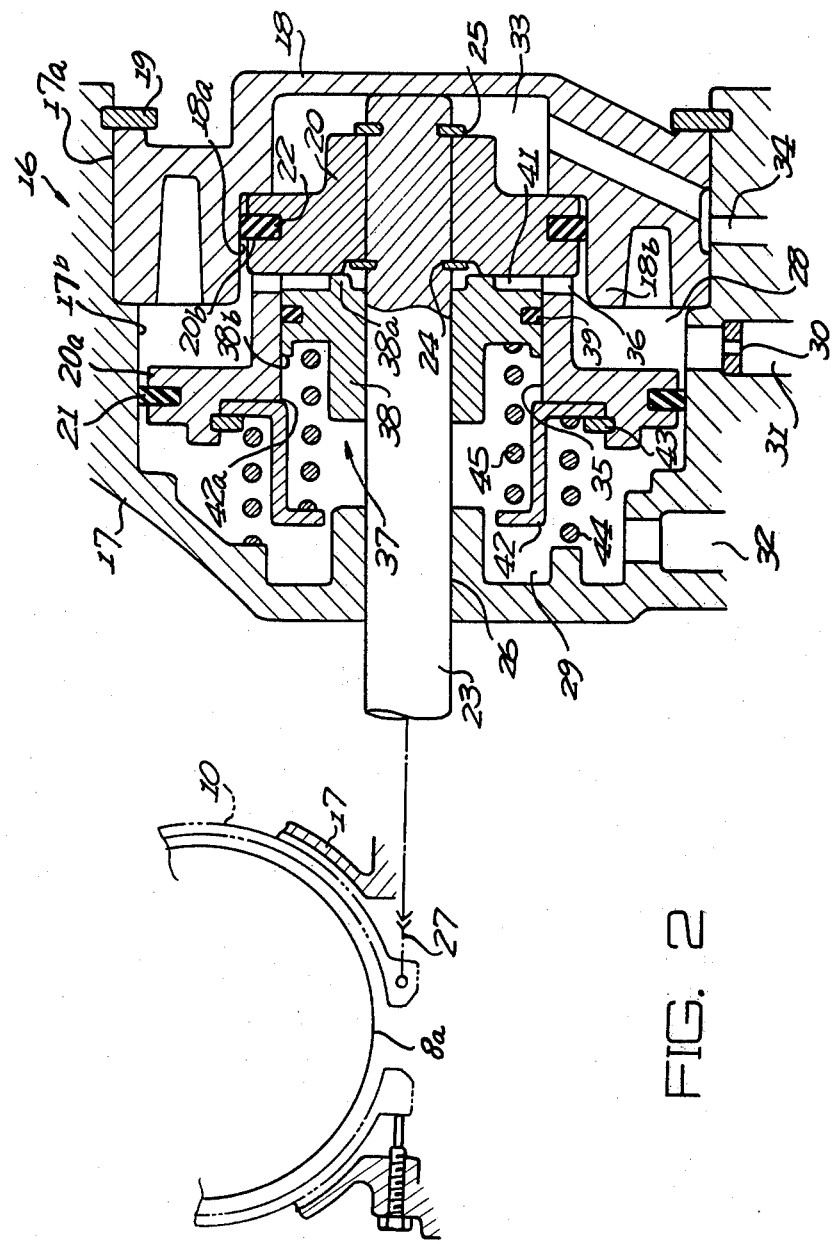
FIG. 2 is a sectional view of the apparatus of the present invention.

Referring to FIG. 2 showing a servomechanism 16 for operating the brake band 10, a cylindrical body 17 of the servomechanism is secured to a case (not shown) of the transmission. A cover 18 is engaged in an opening 17a in the body 17 in watertight engagement and secured by a snap ring 19. In the body 17, a servo-piston 20 is slidably engaged. A large diameter portion 20a of the servo-piston 20 engages with a large diameter cylindrical chamber wall 17b by means of a seal ring 21 and a small diameter portion 20b of the piston 20 engages with a small diameter cylindrical chamber wall 18a by means of a seal ring 22. A piston rod 23 is secured to the piston 20 by snap rings 24 and 25. The piston rod 23 extends passing through a hole 26 in the body 17 and is connected to a strut 27 of the brake band 10. An apply side oil chamber 28 is formed between the large diameter portion 20a of the piston 20, the seal ring 21, the cylindrical chamber wall 17b, the smaller diameter portion 20b of the piston 20, the seal ring 22 and the cover 18, and a release side oil chamber 29 is formed on the opposite side of the piston 20. The oil chamber 28 communicates with a port 31 having an orifice 30 and the oil chamber 29 communicates with a port 32 without an orifice. A chamber 33 on the rear side of the small diameter portion 20b communicates with a drain port 34. Ports 31, 32 communicates with an oil pressure control system (not shown) so as to be supplied with line pressure of the system. An axial bore 35 is provided in the servo-piston 20 at the front of the small diameter portion 20b of the piston 20. A plurality of holes 36 are formed in a rear end portion of the axial bore 35 of the servo-piston 20 so as to communicate the oil chamber 28 with an accumulator chamber 41 in the rear end portion of the axial bore 35. The small diameter chamber wall 18a of the cover 18 has a taper portion 18b so that the holes 36 always communicate with the oil chamber 28 even at the end of the rearward stroke of the piston 20 as shown in FIG. 2.

An accumulator 37 is provided in the bore 35. The accumulator 37 comprises an accumulator piston 38 which is slidably mounted in the bore 35 by means of a seal ring 39 and slidably mounted on the piston rod 23. An annular projection 38a is formed on the rear end of the piston 38. A spring holder 42 having an inner diameter smaller than that of the bore 35 is secured to the front end of the piston 20 by a snap ring 43. A return spring 44 is provided between the body 17 and the spring holder 42 and an accumulator spring 45 is provided between an inwardly directed flange formed at an end of the spring holder 42 and the accumulator piston 38. The accumulator piston 38 has an annular projection 38b which abuts on an edge 42a of the spring holder 42 at the forward stroke end of the piston 38 so that the piston 38 is integrated with the servo-piston 20.

Figure 3:
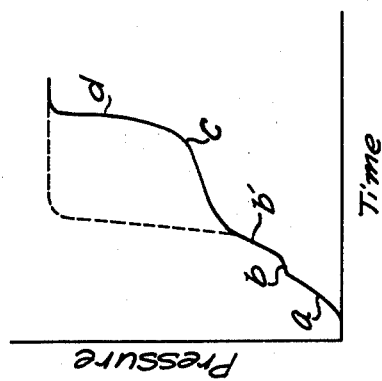
FIG. 3 is a graph showing variation of oil pressure.

In operation, when the brake band 10 is released in the first speed, the servo-piston 20 and the accumulator piston 38 are positioned at a rearward position as shown in FIG. 2. When the transmission changes to the second speed condition, the line pressure is applied to the oil chamber 28 through the orifice 30 and also applied to the oil chamber 41 through holes 36. The oil pressure in the chambers 28 and 41 increases as shown by a in FIG. 3 because the servo-piston 20 and the accumulator piston 38 are not yet moved against their biasing by the springs 44 and 45. When the oil pressure in chambers 28, 41 exceeds a predetermined value, the piston 20 starts to move to the left against the return spring 44. Since the pressure application area of the large diameter portion 20a is greater than that of the accumulator piston 38, only the piston 20 moves to the left which in turn moves the piston rod 23 connected thereto. Thus, the brake band 10 is slightly applied to the drum 8a. Since the capacity of the oil chamber 28 increases by the piston 20 moving forward, the oil pressure increases slowly as shown by b. When the brake band 10 engages with the drum 8a, the piston 20 stops and the capacity of the chamber 28 no longer increases. Thus, the oil pressure steeply increases as shown by b'. When the oil pressure reaches a predetermined value, the accumulator piston 38 starts moving to the left against the accumulator spring 45. Since the capacity of the oil chamber 41 now increases, the oil pressure in chambers 28, 41 increases slowly as shown by c. As the oil pressure increases, the brake band pressure applied to the drum 8a increases via the piston 20 and the piston rod 23. Thus, in accordance with the above the brake band 10 is gradually applied to the drum 8a. When the annular projection 38b engages with the edge 42a of the spring holder 42, the oil pressure increases rapidly as shown by d since there is no volume increase of the chambers 28, 41. Thus, the brake band 10 is tightened at a high oil pressure.

When the pressure oil is applied to both parts 31 and 32, the piston 20 and the accumulator piston 38 are moved to the right by the force of the return spring 44 and the accumulator spring 45 and the difference between the areas of the opposite sides of the large diameter portion 20a, the operative pressure application surface of the large diameter portion 20a is greater in the release side than on the apply side oil chamber. Thus, the brake band 10 is released, which results in the third speed. When pressure oil in the chamber 29 is drained, the piston 20 moves to the left in the same manner as the above described operation. Thus, the transmission changes from the third speed to the second speed.

What is claimed is:

1. A speed change control system for an automatic transmission having a planetary gear mechanism, and a brake band engageable with a brake drum for altering the transmission ratio, comprising
a body defining a cylindrical chamber,
a servo-piston having an axial bore and slidably engaged in said cylindrical chamber,
a piston rod secured to said servo-piston and to said brake band,
an accumulator piston slidably disposed in said axial bore,
a first spring means provided between said servo-piston and an inner wall of said cylindrical chamber of said body for returning said servo-piston in a direction, opposite to a direction of engagement of the brake band with the brake drum, for releasing said brake band,
a second spring means operatively connected between said accumulator piston and said servo-piston for biasing said accumulator piston,
said servo-piston in cooperation with said cylindrical chamber defining apply side and release side oil chambers respectively on opposite sides of said servo-piston,
said accumulator piston on one side thereof in cooperation with said axial bore defining an accumulator oil chamber,
said body is formed with ports communicating with said apply side and release side oil chambers, respectively,
passage means for communicating said apply side oil chamber with said accumulator oil chamber, and
means for engaging said accumulator piston with said servo-piston after the accumulator piston moves a predetermined stroke in said direction of engagement of the brake band against said second spring means, said accumulator piston in cooperation with said first and second spring means, said servo-piston and said passage means constituting means for moving said accumulator piston against said second spring means after said servo-piston moves against said first spring means when oil pressure is applied to said apply side oil chamber via one of said ports.

2. The speed change control system for an automatic transmission according to claim 1, wherein
said servo-piston has a first operative pressure application surface receiving operative pressure in said release side oil chamber and a second operative pressure application surface receiving operative pressure in said apply side oil chamber,
the area of said first operative pressure application surface is larger than that of said second operative pressure application surface.

3. The speed change control system for an automatic transmission according to claim 2, further comprising means for applying both of said ports with oil pressure.

4. The speed change control system for an automatic transmission according to claim 1, further comprising
a spring holder is connected to said servo-piston and constitutes means for holding said second spring means.

5. The speed change control system for an automatic transmission according to claim 4, wherein
said second spring means is disposed against said spring holder on an inside thereof and said first spring means is disposed against said spring holder on an outside thereof.

6. The speed change control system for an automatic transmission according to claim 4, wherein
said engaging means constitutes a radially inwardly directed edge of said spring holder.

7. The speed change control system for an automatic transmission according to claim 1, wherein
said one port is formed with an orifice.

8. The speed change control system for an automatic transmission according to claim 1, wherein
said accumulator piston is slidably mounted on said piston rod.

9. The speed change control system for an automatic transmission according to claim 1, wherein
said servo-piston has an operative pressure application area in said apply side oil chamber larger than an operative pressure application area of said accumulator piston in said accumulator oil chamber.

10. The speed change control system for an automatic transmission according to claim 1, wherein
said accumulator oil chamber is defined further by a wall of said servo-piston limiting an end of said axial bore.

11. The speed change control system for an automatic transmission according to claim 1, wherein
said second spring means is for biasing said accumulator piston in said direction opposite to said direction of engagement of said brake band.

* * * * *